US008621513B1

(12) United States Patent
Sun et al.

(10) Patent No.: US 8,621,513 B1
(45) Date of Patent: *Dec. 31, 2013

(54) BROADCASTING CHANNELS OF STREAMING MEDIA CONTENT IN A WIRELESS TELECOMMUNICATIONS NETWORK

(71) Applicant: Clearwire IP Holdings LLC, Bellevue, WA (US)

(72) Inventors: Yaojun Sun, South Riding, VA (US); Jing Gu, Herndon, VA (US); Lyle Bertz, Lee's Summit, MO (US); Wei-Ming Lan, Morrisville, NC (US)

(73) Assignee: Clearwire IP Holdings LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/757,447

(22) Filed: Feb. 1, 2013

Related U.S. Application Data

(63) Continuation of application No. 12/235,229, filed on Sep. 22, 2008, now Pat. No. 8,370,872.

(51) Int. Cl.
*H04N 5/445* (2011.01)
(52) U.S. Cl.
USPC .................. 725/39; 725/38; 725/52; 725/56; 725/59; 725/73; 725/81

(58) Field of Classification Search
USPC .................. 725/38, 39, 52, 56, 59, 73, 81
See application file for complete search history.

(56) References Cited

U.S. PATENT DOCUMENTS

| 5,890,054 | A  | * | 3/1999  | Logsdon et al. | 455/11.1 |
| 2003/0003909 | A1 | * | 1/2003  | Keronen et al. | 455/434 |
| 2006/0070098 | A1 | * | 3/2006  | Watanabe | 725/43 |
| 2006/0116075 | A1 | * | 6/2006  | Gallo | 455/41.2 |
| 2007/0123258 | A1 | * | 5/2007  | Sawyer | 455/436 |
| 2008/0076432 | A1 | * | 3/2008  | Senarath et al. | 455/442 |
| 2008/0092175 | A1 | * | 4/2008  | Peacock et al. | 725/60 |
| 2008/0311952 | A1 | * | 12/2008 | Sugiyama | 455/556.1 |
| 2009/0144777 | A1 | * | 6/2009  | Mikami et al. | 725/50 |

\* cited by examiner

*Primary Examiner* — Pankaj Kumar
*Assistant Examiner* — Sahar Baig (57) ABSTRACT

Systems, methods and media are provided for presenting a group of available broadcast channels utilizing a wireless network upon initiation of a channel-viewing graphical user interface (GUI). The group comprises channels that can be broadcast most efficiently to the mobile device. After initiating the channel-viewing GUI on the mobile device, requests are communicated to elements on the network to retrieve lists of currently broadcast channels in the area and currently viewed channels throughout the wireless network. A list also is retrieved of recently viewed channels on the mobile device. At least a portion of each list is then presented on the channel-viewing GUI. The lists can be sent by a first video media proxy (VMP) server and a broadcast management server (BMS).

10 Claims, 5 Drawing Sheets

BROADCASTING CHANNELS OF STREAMING MEDIA CONTENT IN A WIRELESS TELECOMMUNICATIONS NETWORK

CROSS-REFERENCE TO RELATED APPLICATIONS

This application is a continuation of U.S. patent application Ser. No. 12/235,229, filed Sep. 22, 2008, entitled "Broadcasting Channels Of Streaming Media Content In A Wireless Telecommunications Network," which is herein incorporated by reference.

SUMMARY

The present invention is defined by the claims below, but summarily, embodiments of the present invention provide for methods, media, and systems for presenting channels on a graphical user interface (GUI) so as to promote efficient use of wireless access networks for television viewing. In a wireless microwave access network, bandwidth constraints can limit the number of channels that may be simultaneously broadcast, particularly if those channels are bandwidth intensive in nature. Therefore, for such data-intensive streams as television programming, optimization of broadcast channels can improve the performance of the network. As consumers demand higher resolution programming, for example high-definition video, then the optimal utilization of available bandwidth increases any performance improvements. One manner for optimizing bandwidth usage is to direct users' attention to channels that are already available on a given network.

In a first aspect, computer-storage media with computer-executable instructions embodied thereon perform a method of presenting a list of available broadcast channels utilizing a wireless network on a display of a mobile device. The list of available broadcast channels includes channels that can be broadcast most efficiently to the mobile device. At the mobile device, a list of currently broadcast channels is obtained that are currently being broadcast within a first access service network that is providing access to the mobile device. At the mobile device, a list of currently viewed channels is obtained that are currently being viewed within a plurality of access service networks throughout the wireless network. At the mobile device, a list of recently viewed channels on the mobile device is retrieved. On the mobile device is displayed at least a portion of the list of currently broadcast channels in the first access service network. Also on the mobile device is displayed at least a portion of the list of currently viewed channels that are currently being viewed within the plurality of access service networks throughout the wireless network. Additionally, on the mobile device is displayed at least a portion of the list of recently viewed channels on the mobile device. The displayed list of currently broadcast channels in the first access service network is displayed more prominently than the displayed list of currently viewed channels throughout the wireless network.

In a second aspect, computer-storage media with computer-executable instructions embodied thereon perform a method of providing a list of available broadcast channels utilizing a wireless network to a mobile device. The list of available broadcast channels includes channels that can be broadcast most efficiently to the mobile device. Channel-based content is streamed to a plurality of video media proxy (VMP) servers. Each VMP server is located on a respective one of a plurality of access service networks within the telecommunications network. A list is determined of currently broadcast channels in the access service network that is providing access to the mobile device. There is communicated to the mobile device a portion of the list of currently broadcast channels in the access service network that is providing access to the mobile device. A list is determined of channels that are currently being viewed in the access service networks throughout the telecommunications network. There is communicated to the mobile device a portion of the list of channels that are currently being viewed in access service networks throughout the telecommunications network.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems, media, and methods for presenting channels of streaming content that promote the most efficient usage of bandwidth in a microwave wireless network. By most prominently presenting channels of television programming that currently are being viewed in a particular area, users are likely to select those specified channels. By creating a presentation that drives users to this content, those users are readily able to receive the programming, rather than placing a request for channels that are not already being broadcast in that area. Any elimination of additional requests helps the provider as well. The network provider does not experience additional strain on the portions of the network that provide access by virtue of this reduction in requests.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| ASN | Access Service Network |
| BMS | Broadcast Management Server |
| BTS | Base Transceiver Station |
| CSN | Connectivity Service Network |
| IP | Internet Protocol |
| MMG | Multi-Media Gateway |
| SOFDMA | Scalable Orthogonal Frequency Division Multiple Access |

| | |
|---|---|
| VMP | Video Media Proxy |
| WiMAX ™ | Wireless Microwave Access |

Further, various technical terms are used throughout this description. An illustrative resource that fleshes out various aspects of these terms can be found in *Newton's Telecom Dictionary* by H. Newton, 22$^{nd}$ Edition (2006).

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Overview

The following will describe the presentation of channels for utilization in a wireless microwave access network. Even more specifically, the embodiments described will be for television-viewing channels in a WiMAX™-compatible network. WiMAX networks are those meeting the standards promulgated by the WiMAX Forum®, administered at Beaverton, Oreg. The described embodiments will reference a wireless mobile device operating in such a network in order to access high-quality live or pre-recorded television programming, such as that provided by a broadcast television or cable television network. However, this should not be construed as a limitation of the present invention. Networks configured to allow user selection of broadcast channels and constrained with regard to broadcast bandwidth for data streams will fall within the contemplated scope of the present invention. Thus, other specific protocols and standards may be used, as may different instances of media content.

The broadcast capabilities of WiMAX-compliant networks are limited by several factors common to many broadcasting methods, including the amount of bandwidth available for allocation. For example, consider a total broadcast bandwidth allocation of 40 Megahertz (MHz), where 4 MHz is utilized to broadcast an instance of television programming. Intuitively, 10 channels are available for these broadcasts. This provides the number of channels available for simultaneous broadcast in any single access area. Increasing or reducing the image quality through a change in the amount of data transmitted consequently alters the number of channels that may be broadcast. Enabling 2 MHz-broadcasts of programming doubles the number of available channels to 20. While a network provider may be able to broadcast more channels by reducing the quality of the programming, ultimately there is a tradeoff for the viewer and provider. Reducing the quality beyond a certain point causes the viewer to notice that quality, or lack thereof, and choose not to view the content. Therefore, there is a "floor" in terms of quality, at which point further reduction is not possible.

As a result of these constraints, provider attempts to optimize broadcast capabilities will employ other means. One such optimization is the pre-loading of instances of content on video media proxy (VMP) servers at each base transceiver station (BTS) in the access portions of a network. The configuration of a typical wireless microwave access network will be described in further detail below. However, the access portions of a network, which will be referred to as an access services network (ASN), is the area serviced by one or more BTSs. An application server that streams media content is typically located either on a provider's core network, also referred to as a connectivity services network (CSN), or on a different network altogether. Thus, a request for an instance of streaming media requires communication between an ASN and its CSN, or the ASN and an entirely different network. By associating a VMP with each BTS and pre-loading instances, quicker access to a desired streaming instance is enabled. Use of a broadcast management server (BMS) on the core network allows efficiencies between ASNs to occur, as described more fully in U.S. patent application Ser. No. 12/040,532 entitled "BROADCAST SERVICE CHANNEL OPTIMIZATION FOR TV SERVICES." That application is related in subject matter to the present Application and the entirety of which is hereby incorporated by reference.

Another optimization, and the subject of this Application specifically, involves directing users to content that is already being broadcast on the network. Using the example allocation above, an access network in full use can have 10 channels simultaneously broadcasting. When users within that ASN select channels that are already provided within the broadcast area, it promotes efficient operation. The requests for channels that need to be retrieved, loaded, and streamed are reduced, which minimizes set up and negotiation between the ASN and an external network application server. Likewise, traffic required between the ASN and its CSN is reduced if that server is already streaming to the BTS in question. However, in order to enable this optimization, a method of presentation will be coordinated between the requesting device and the network resources already in place.

Client Application and Exemplary Screen Presentations

According to embodiments of the present invention, a smart client device executes an application that presents a graphical user interface (GUI). The GUI allows a user to select a channel through the use of a linked icon, graphics, or portion of text as illustrated below. When first initiated, a series of requests are made to list available television programming. Without the embodiments of the present invention, this list would likely sort programming by a means that doesn't promote network efficiency. Examples without the present embodiments include an alphabetical listing, ordering according to previous selections on the mobile device, or other default settings instantiated by the device, user profile or network. This can require a user to scroll through listings, encounter difficulties finding programming content, and prevent the notation of programming that is most efficiently available. As an alternative, the application described herein requests programming according to methods elaborated upon further in the section "Derivation of Program Listings" below to optimize the presentation ultimately placed before the user.

In the figures and succeeding descriptions, like numbering will be used where possible. In accordance with the contemplated embodiments of the present invention, a potential implementation is shown on an exemplary mobile device in FIG. 1. A mobile device 100 is shown as a hybrid personal data assistant and cellular telephone device. Mobile device 100 is capable of receiving data, such as that used for internet access or streaming media content. However, mobile device 100 is not limited to the type of device shown. Any wireless device capable of receiving a broadcast streaming media instance is contemplated within the scope of the presently claimed embodiments of the invention. Therefore, a web-enabled cellular telephone can be suitable Likewise, network usage can be optimized with a laptop computer executing the described embodiments.

Figure 1:
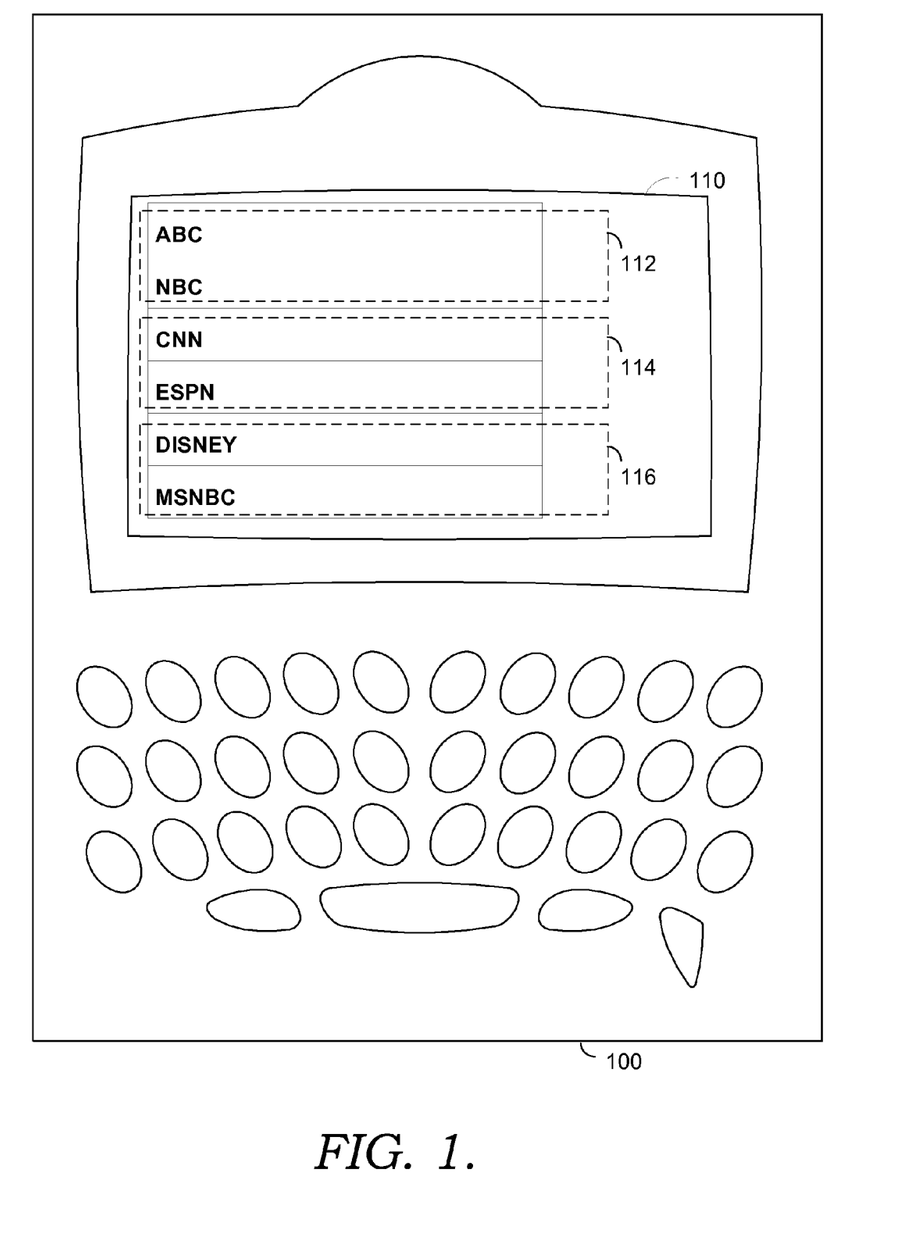
FIG. 1 is an exemplary graphical user interface (GUI) according to embodiments of the present invention.

Mobile device 100 includes a screen presentation 110, which is further divided into presented channels 112, 114, and 116. Screen presentation 110 is the graphical user interface that a user employs to request a channel of television programming on the network. As shown in FIG. 1, presentation 110 encompasses the entire screen area of mobile device 100. However, this is not a requirement of the present invention. Rather, a user interface that uses only a portion of the screen could also be employed. No specific proportion of the screen need be allocated to the GUI of the present invention. In the best efforts to direct users' attention to specific channels, a larger interface may be desirable, but the mobile device used, the specific implementation of the channel presentation, and other capabilities of the network and device may all factor into GUI configuration.

The client application enabling the GUI could be initiated with a user action. An example could be the selection of an icon or linked text in some way showing that the selection is for television broadcasting. An icon showing a television could be used, or a "Get TV" graphic or linked text could be offered. Similarly, a specific gesturing UI sequence could be used, such as gesturing the letters "T" and "V" on a touch screen. The client application could be voice activated with one of a number of phrases. Many other means for activating the client application will be apparent to one of ordinary skill in the art, so that the GUI can be presented to the user.

Presented channels 112, 114, and 116 are each shown as two channels with a corresponding dashed box around them. Each grouping represents a different listing of channels as described in further detail below. In the exemplary figure, presented channels 112 are shown as two so-called "major network" broadcasts. This is not a requirement of the present invention, nor are the fact that two channels are presented intended to be limiting in scope. Rather, presented channels 112 are channels that are currently broadcasting in the access area. This may not be a comprehensive list of all channels broadcast in the area, but may only be a portion of the list using the most popular current broadcast programming. However, the channels that are currently broadcasting in an area will be most prominently displayed, such as placement at the top of the screen, promoting their selection first. Because the provider is already broadcasting these channels in the given ASN, these channels are most easily streamed to the user. There are no additional requests to the CSN or an external application server as the instance is already available in that area. For this reason, a provider may want to provide all of the presently broadcasting channels in the ASN, rather than a portion. In this way, the user can select from a larger number of broadcasting channels, again without incurring additional technological overhead through server set-up and negotiation. In other embodiments, a portion may be visible, while the remainder of the list is easily expandable with the selection of a link or icon.

Presented channels 114 are depicted as a news channel and sports channel. Again, the specific channels are not necessary for implementation of the present invention. Presented channels 114 are those channels which are the most popular programming currently being streamed on the network as a whole, although they are not currently being broadcast in the user's specific access services network. While selection of content not being broadcast in the user's ASN is not the most efficient possible, there are advantages to such a channel selection. If content is broadcast on other access service networks, then movement to a different ASN may mean that the selection is being broadcast on that portion of the network. Likewise, if popular network channels are listed and selected on an ASN not currently broadcasting it, the popularity of the selection may eventually lead to its broadcast on the ASN.

Presented channels 116 depict a children's channel and a second news channel. Once again, these choices are not central to the scope of the present invention. Channels 116 share the common trait of being recently viewed channels on the device that are not part of the channels 112 or 114. Again, while these are not the optimal channels for a user to select, as they are not currently broadcast channels, they do serve the function of making recent selections prominent. If the user tends to return to the same channels again and again, the likelihood of those selections to be broadcast in the area eventually increases.

There are a number of ways to implement presented channels 112, 114, and 116 that cannot be shown in the present drawings. For example, in order to delineate between the three groupings, a different color could be selected for each group. To further enhance this option, a brighter color or an appealing color can be used to mark presented channels 112. This promotes their selection to an even greater degree. An alternative way to mark the channel groupings is through the use of a pattern behind each. For example, a pattern of vertical lines could be used behind channels 112, a dotted pattern seen behind channels 114, and a cross-hatch pattern placed behind channels 116. These are not intended to be limiting as any patterns are also possible within the scope of the invention, as are alternative markings not listed above.

Figure 2:
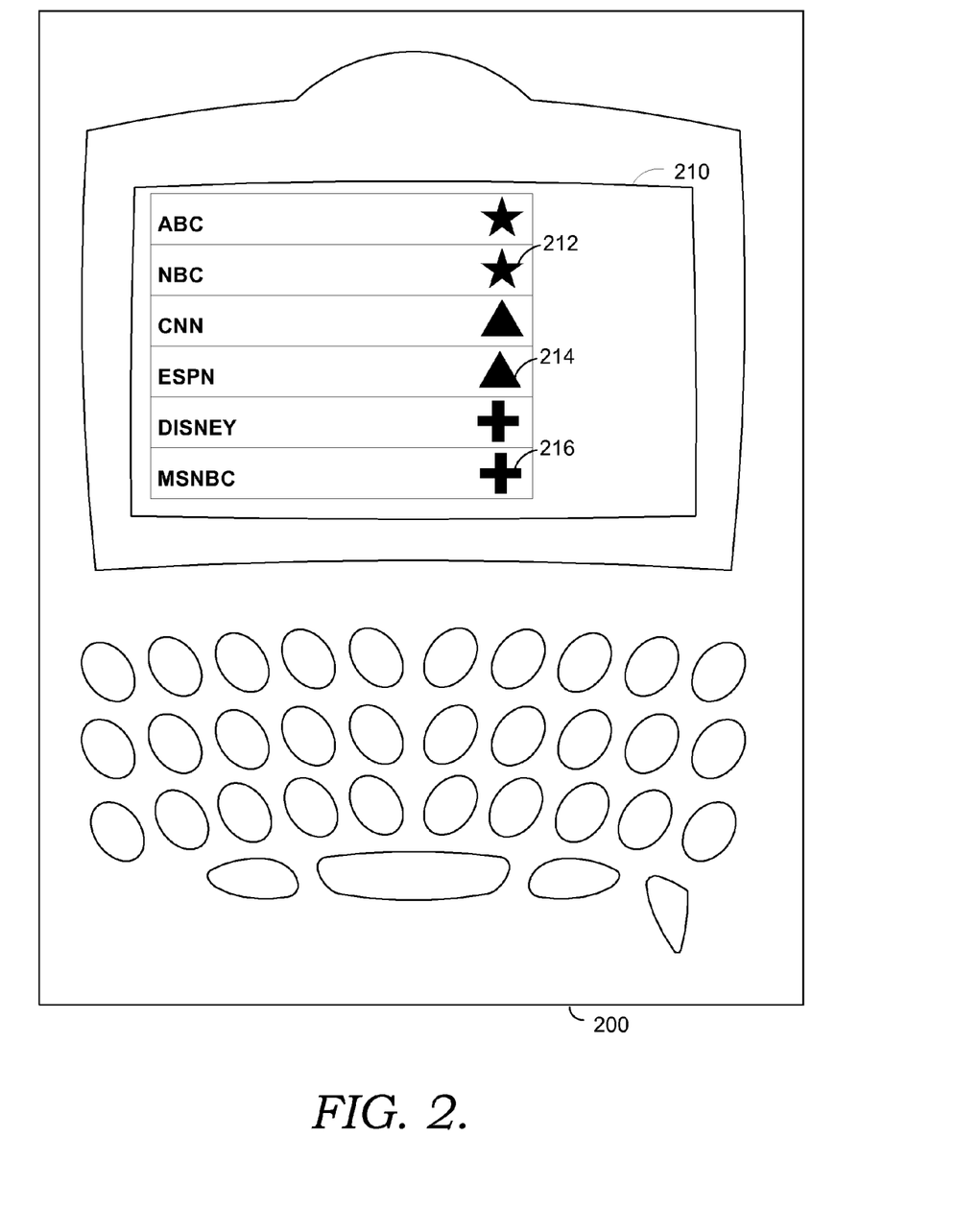
FIG. 2 is an exemplary GUI utilizing graphical icons in accordance with embodiments of the present invention.
Figure 3:
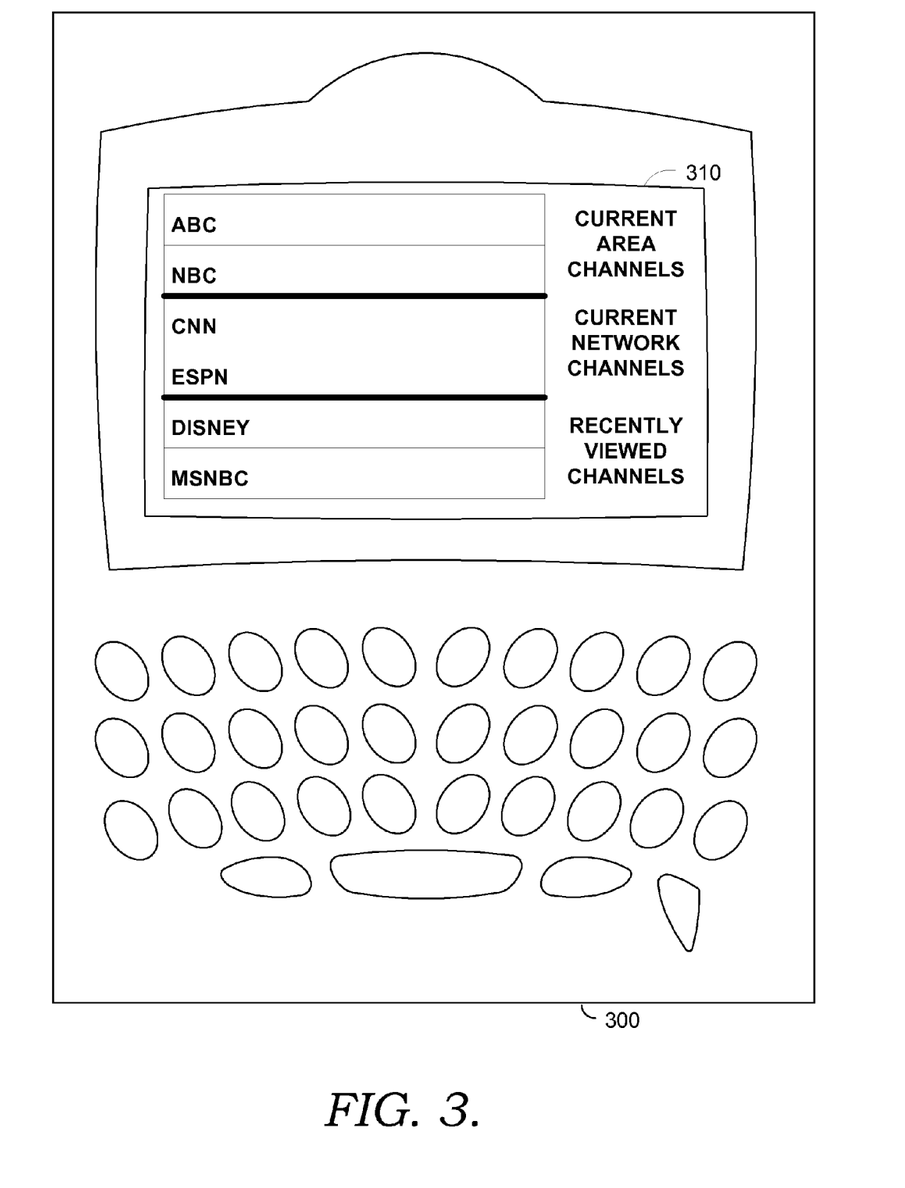
FIG. 3 is an exemplary GUI utilizing separators and text descriptions according to embodiments of the present invention.

Looking at FIGS. 2 and 3, still further alternative embodiments are depicted. FIG. 2 shows a mobile device 200 with a screen presentation 210. Each are substantially similar to device 100 and presentation 110, respectively, shown in FIG. 1. However, in this exemplary depiction, the channel groupings are denoted with presentation icons 212, 214, and 216. The presentation icons serve the same function as the color- or pattern-coded groups shown previously. In this instance, there is a noticeable difference in representations. Exemplary icons 212, 214, and 216 are not intended to add limitation to the scope of the invention and are illustrative in nature. Thus, the particular shapes used are not necessary. In fact, geometric shapes in general are not needed, as the icon could be a graphic depiction of a relevant object relevant, such as a broadcast tower symbol for icon 212, a network-connection symbol for icon 214, and a mobile device symbol for icon 216. Graphic depictions are not necessary either. A small picture of a tower, server, and mobile device could also be used in the place of each icon. Other graphics or pictures, topically related or unrelated, not listed above may also be used.

The final exemplary display, shown in FIG. 3 with mobile device 300 and screen presentation 310 shows yet another alternative embodiment. In screen presentation 310, the groupings are not individually numbered. Instead, they are shown with a pronounced separator between groupings in the form of two bold separation lines. The listing that each group contains is actually written to the right of the channels, so that "Current Area Channels," "Current Network Channels," and "Recently Viewed Channels" is clearly seen to the right of the channel selection bars. These may in and of themselves mark the channels presented, or may incorporate other embodiments, such as the color coding described above.

Additionally, other means of implementation such as particular focus indicators may be used for these groupings. For example, the area channels text may have a focus indicator similar to a glowing effect that particularly draws attention to either the text itself, or the channels in the group. The network text or channels can have a bold effect, making the text visually pronounced, but not as visually attractive as the glowing effect. In an implementation of this nature, the recently viewed channels may not have any special effects at all, but are simply presented as seen in the figure.

The above descriptions are meant to be exemplary and are by no means exhaustive. Each presentation has shown the channel selection means as a bar-like shape on-screen. This is not necessary as any shape, size, or graphic may be used. Some of the embodiments described can be used with a graphic, such as a network logo. Alternatively, text with the programming name could be used. Of course, many other means of selecting programs and drawing attention to these groupings not described above, but apparent to one of ordinary skill in the art, are contemplated within the scope of the embodiments of the present invention.

Exemplary Architecture

In order for the GUI above to be enjoy greater usefulness, the smart client device will be operating on a network configured in such a way that enables the requests and overall programming functionality described herein. An exemplary architecture will be described that includes components that can carry out these features. The described architecture will omit intermediary elements that may be useful but common in nature, such as routers, switches, repeaters, and other typical network devices.

Figure 4:
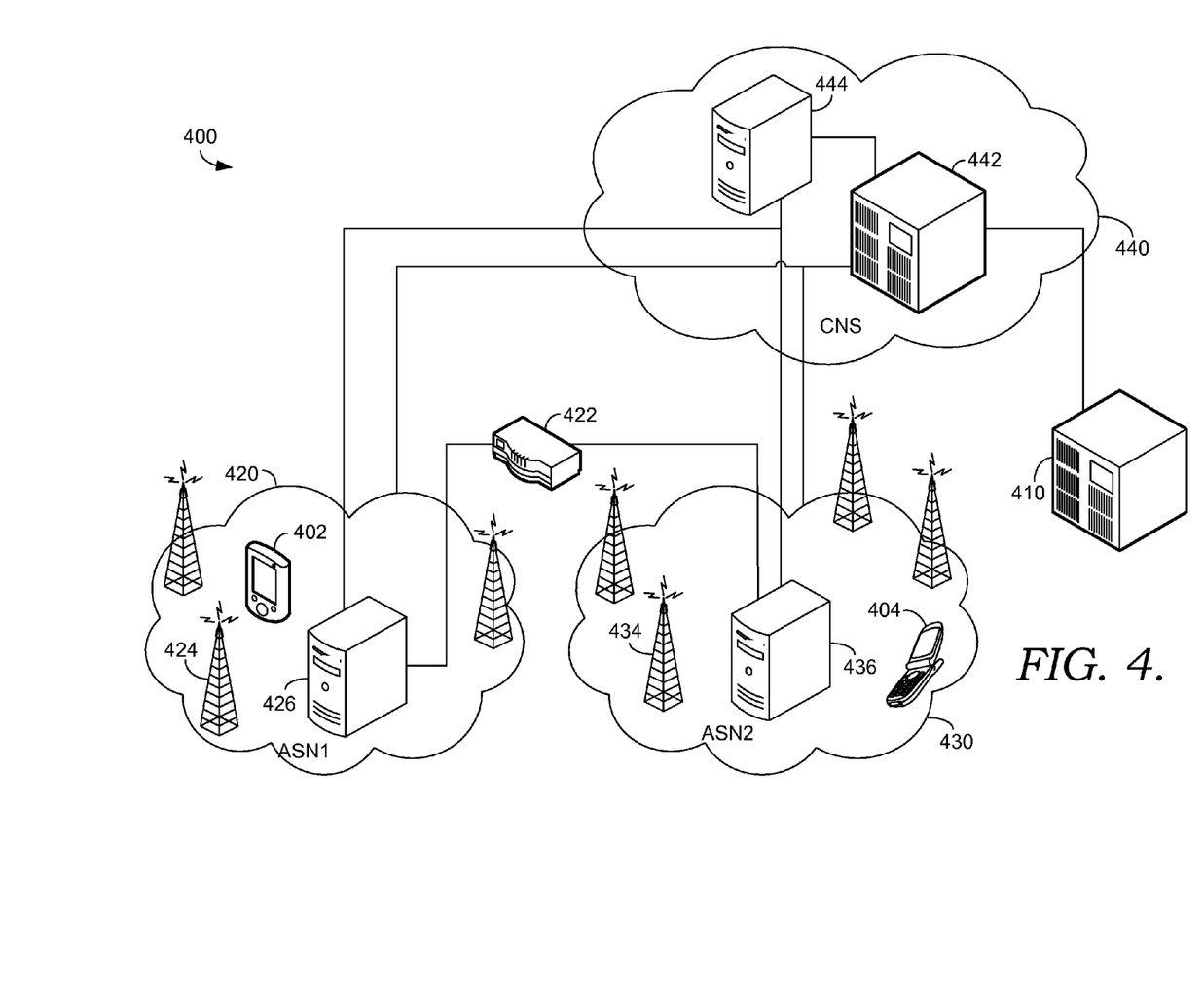
FIG. 4 is an exemplary architecture suitable for implementing systems in accordance with embodiments of the present invention.

Turning now to FIG. 4, a simplified view of a telecommunications data network 400 utilizing wireless microwave access is depicted. Network 400 is meant to be illustrative in nature and should not be construed as limiting the scope of the invention to the specific configurations or quantities of components shown. Network 400 is depicted as two types of non-distinct networks, a connectivity service network 440 and two access service networks 420 and 430. Other embodiments of the present invention may have more than one connectivity service network 440. Similarly, embodiments may and likely will have more than two access service networks. Only two have been depicted for the sake of clarity. The division of the two types of networks again is for illustrative purposes only and there can be overlap in equipment and function between the CSN and ASNs.

Shown in ASN 420 is a base station 424. There are two other base stations shown but not numbered. Also not shown or numbered are associated base station controllers and a variety of other components. These components perform a number of functions for associated base stations by allocating bandwidth, routing connections, and converting signals, along with multiple other tasks. A first wireless access device 402 is depicted in ASN 420. While access device 402 is shown as a hybrid phone and personal data assistant (PDA) unit, this device is not selected to limit the types of devices that may operate in ASN 402. In fact, web-enabled cellular phones, conventional PDAs, laptops, and personal computers could all use ASN 402. Any device capable of using the smart client GUI described above and below is contemplated. Access service network 402 is not intended to be limited to one device or three base stations. ASN 430 shows a user device 404, here seen as a cellular telephone.

ASN 430 can provide access to device 404 from base station 434, or from a substantially similar one, in a like manner as ASN 420 to device 402. Again, several base stations are depicted in ASN 430, but are not numbered for clear illustration. ASNs 420 and 430 are not meant to require any particular wireless network protocol, but may use a number of different signaling means. One example is scalable orthogonal frequency division multiple access (SOFDMA) protocol, which could be used in a microwave access setting. This example may be compatible with various standards-based networks, as exemplified by a WiMAX-compliant network.

As part of its connectivity to the internet, CSN 440 is depicted with a logical connection to a streaming server 410. Alternatively, streaming server 410 can be referred to as an application server or a content source. It is contemplated within the scope of the present invention that streaming server 410 could be a streaming video server providing video content. Specifically, streaming server 410 could be an application server that streams live or recorded television content to the Internet.

Streaming server 410 is logically coupled to CNS 440 by way of a multi-media gateway (MMG) 442. Generically, a multi-media gateway is a computing device enabling, among other things, communication between devices on different types of networks or using different signaling protocols. In the exemplary case, MMG 442 allows streaming video server 410 to transmit video content to a network that uses a different signaling protocol. For example, if streaming video server 410 uses Internet Protocol (IP) and ASN 420 uses a protocol such as SOFDMA, the multi-media gateway 442 converts from one protocol to the other as necessary. After converting the signals to a useable form, MMG 442 then sends the instance of streaming media content to an access services network device, such as one found at ASN 420 or 430. The direct connection shown between MMG 442 and ASNs 420 and 430 should not be construed as a direct connection or without devices between the two. To the contrary, there likely are intermediary devices that route signals from MMG 442 to an ASN. The solid lines are meant to establish only that the flow of communicated streaming media can pass through MMG 442 and reach ASN 420 or 430.

Also shown in FIG. 4 is a broadcast-management server (BMS) 444, which is logically coupled to multi-media gateway 442 and to devices located on ASNs 420 and 430. Broadcast-management server 442 can be seen as a central controller for all of the broadcasts on connected access service networks. BMS 444 processes the instances of streaming content that are being sent to access service networks, as well as the requests that are received to broadcast streaming content. In addition to collecting information, BMS 444 acts as a decision-making processor that manages resources for competing requests of bandwidth allocation in access service networks. For all ASNs connected with CSN 440, the BMS will coordinate broadcasting channels and instances of streaming media.

Continuing with FIG. 4, BMS 444 is connected to ASNs 420 and 430 through video media proxy (VMP) servers 426 and 436, respectively. The purpose of video media proxy server 426 is to "queue" instances of streaming media for access services network base station 424. VMP server 436 serves the same function for base station 434 as would any VMP server for its associated base station. Application server 410 is able to stream more instances of streaming media content to a VMP server than its associated base station would be able to broadcast. As an example, a broadcast bandwidth may be allocated for 10 channels, but the VMP server could receive 100 instances. In this case, 90 instances could be queued for future use by other users when channels become available.

Unlike bandwidth constraints of allocating channels for broadcast, VMP servers are only constrained by processing speed, memory space and the bandwidth available to the server (i.e. through a wired connection). Therefore, the ability to queue content depends on hardware, rather than constraints such as allocable bandwidth for over-the-air broadcasts. Rules can be in place for queuing instances so streaming media may be flexible. They could include frequently requested instances, recently requested streams, or providers who pay additional fees to ensure their streaming content is sent to VMP servers. These are merely intended as examples, however, and should not limit the types of decisioning that would determine the instances that are available at the VMP servers.

Derivation of Program Listings

While the application ultimately displays the GUI on the smart client device, a series of requests and/or responses are carried out enabling generation of the display. Coordination of the client application on the wireless device with access service network and connectivity service network components directs the flow of information utilized by the GUI. This process can, in turn, be primarily driven by the application on the device, the network components used to provide information, or some combination of the two as will be described below. The described processes cover certain embodiments of the present invention, but additional means for carrying out these steps will be apparent to one of ordinary skill in the art and are contemplated within the scope of the present invention.

The promotion of efficient bandwidth usage through the GUI presentation begins when the device initiates a session using the GUI. Once the session begins, the primary motivator for presenting certain programming options more prominently than others dissipates. This is because the initial selection of television programming determines the efficiency with which bandwidth is used, not through the continued consumption of the first-picked programming. As a result, the described methods will be carried out when a user is seeking to select programming and will not take place during other events that could affect the session, such as moving from one access area to another, or radical shifts in consumption in a user's particular access services network.

Figure 5:
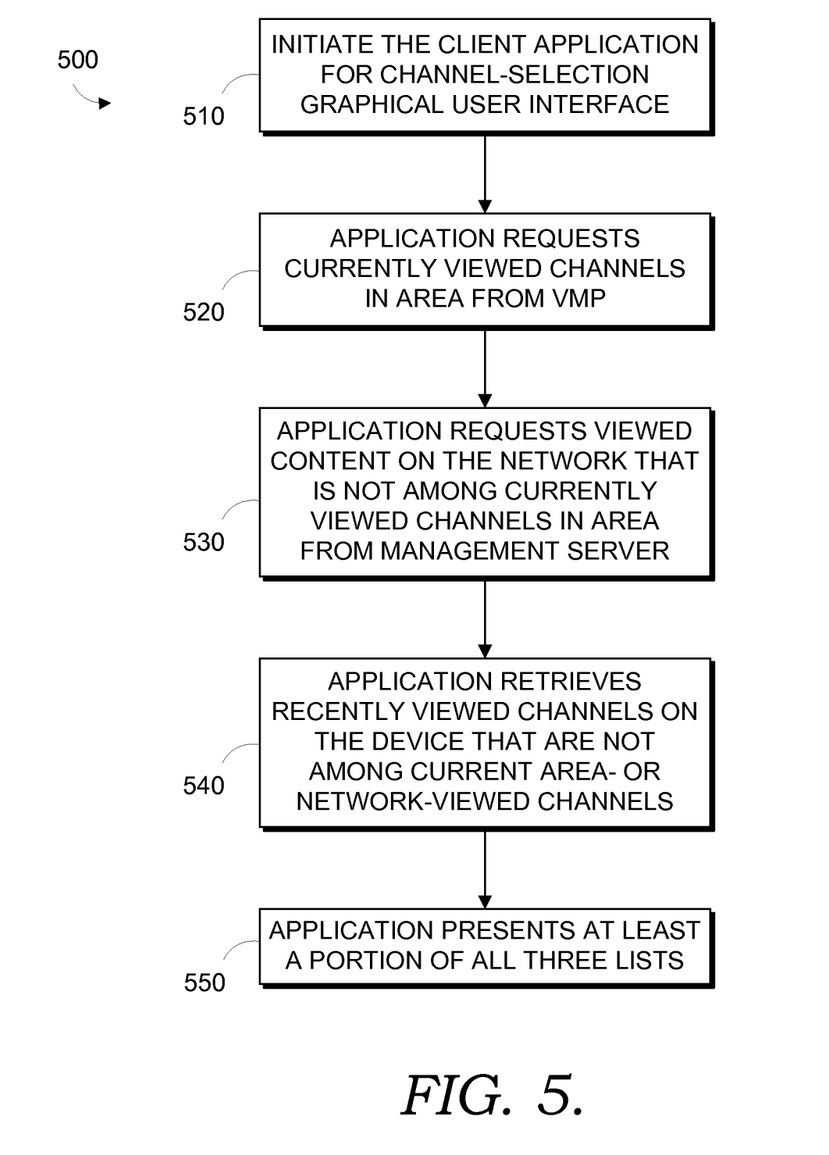
FIG. 5 is a flowchart of a method for presenting channels on a GUI according to embodiments of the present invention.

A flowchart depicts a method as seen in FIG. 5, for determining the lists and constructing the screen presentations described above. At a step 510, the client application is initiated. This could be on a device as shown above in the exemplary screen presentations, or on a different mobile device in communication with a WiMAX-compliant network. At a step 520, a series of requests and responses begins with a request for programming currently broadcast in the access services network. This creates a first list of television programs available in the user's immediate area that can be viewed without streaming any additional programming. In the examples seen above, this can be one of the up to 10 programs that is simultaneously available in a particular area. In one embodiment, this list is generated by the video media proxy server, sorted from the most to fewest users that are accessing the content, and sent to the client device pre-sorted. This allows the first set of presentation channels, seen above as channels 112 or 212, to be accessed by the client device.

The client application then requests the most popular programming being viewed throughout the network at a step 530. In a described embodiment, this list is generated by the broadcast management server on the connectivity services network, sorted by popularity, and communicated to the client device. Because any channel already broadcast by the BTS in that ASN will be included on the first list, the information provided by the BMS will be compared against the list provided in step 520. The client application will eliminate duplicate programs in order to arrive at a final list of network-viewed programming.

At a step 540, the client application retrieves the programming most recently accessed by the device so that a recent programs list may be compiled. Again, those programs that have already appeared on the other two lists will not be duplicated. If all the recent programming on the device is currently shown in the ASN broadcast area, there will not be a need to display them once again. However, for those programs that do not appear on the previous two lists, a third list will be finalized. In one embodiment, this can be a chronological listing of the most recently viewed program appearing first and working backward in reverse order of viewing.

Once all three lists have been compiled, communicated, sorted, and finalized, the GUI will present all three or at least portions thereof. As shown in FIGS. 1-3 above, this could be as simple as displaying the top two options in each list. The paring of lists is not necessary however, as the GUI may present each list in its entirety, minus the previously described de-duplication of programming. As noted above, portions of the lists may be available as a default option, with the ability to expand each list to include further programming options on unseen parts of each list. All of the broadcast list can be available with expandable portions of the other two lists, as the broadcast list is the group of programming instances that can be shown most efficiently to the user.

There are also alternatives to the embodiments described above with regard to the communication of information between components. Because a simple list of available and currently viewed programming is not data intensive, the BMS located on the connectivity services network could periodically provide the list of network-viewed programming to the VMP servers located in each access services network. By pushing such a list, for example once every minute or every five minutes, the lists needed for step 530 could be received without requiring communication to the BMS individually for each wireless device. Such a delegation of information would reduce the real-time effect of the list on the client device, as this may be slightly outdated information. However, it could reduce the request and response time needed to generate the client GUI.

Other embodiments are also possible with regard to the information transfer described above. Rather than reduce the lists at the client device, the VMP server and BMS can automatically truncate the lists each communicates so that the client application receives only the amount of information necessary. While the ASN may be limited to simultaneous broadcast of 10 channels at a time, and therefore have a small list, the network may have hundreds of programs available. As a result, a large network can have a very large number of programs currently being accessed. Rather than send an entire list and allow the client application to reduce it, the method could cut the BMS-transmitted list off at 20 programs, allowing for the 20 most popular programs and the removal of up to 10 duplicate listings.

Still further embodiments are possible as the sorting need not take place at the BMS or VMP servers. The client application may receive unsorted lists so that the comparison of all three lists can occur at the device and sorting occurs after the de-duplication process has occurred. An oppositely oriented embodiment also can be implemented where the initial requests are sent with the device's most recently viewed programs. The VMP, the BMS, or both could use the information in generating the necessary area and network program lists with each server handling the comparisons, sorting and finalization of lists Also, the number of program listings available on the client device may be determined by the VMP, BMS, or both, rather than on the client device. The BMS could be in communication with other CSN components to determine that the user has a high quality of service (QoS) guarantee and is entitled to greater network privileges. Thus, the entire list of broadcast area programs and a large number of network programs may be sent, as the user will enjoy greater privileges for unicast streaming in the event his or her desired programming is not being broadcast at the moment. Conversely, a user with a lower QoS guarantee may be querying the network at a time of high traffic. That user may only be given the 10 broadcast channels as the bandwidth required for a high-definition unicast may not be available for them at that particular time.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more nontransitory computer-readable media having embodied thereon computer-useable instructions that, when executed, cause one or more computing devices to perform a method for presenting a list of available broadcast channels utilizing a wireless network on a display of a mobile device, wherein the list of available broadcast channels includes channels that can be broadcast most efficiently to the mobile device, the method comprising:
   at the mobile device, obtaining a list of currently broadcast channels that are currently being broadcast within a first access service network that is providing access to the mobile device;
   at the mobile device, obtaining a list of currently viewed channels that are currently being viewed within a plurality of access service networks throughout the wireless network;
   at the mobile device, retrieving a list of recently viewed channels on the mobile device;
   displaying on the mobile device at least a portion of the list of currently broadcast channels in the first access service network;
   displaying on the mobile device at least a portion of the list of currently viewed channels that are currently being viewed within the plurality of access service networks throughout the wireless network; and
   displaying on the mobile device at least a portion of the list of recently viewed channels on the mobile device;
   wherein the displayed list of currently broadcast channels in the first access service network is displayed more prominently than the displayed list of currently viewed channels throughout the wireless network; and wherein the displayed list of currently viewed channels throughout the wireless network does not include channels that are included in the list of currently broadcast channels within the first access service network.

2. The media of claim 1, wherein the displayed list of currently viewed channels throughout the wireless network is displayed more prominently than the displayed list of recently viewed channels on the mobile device.

3. The media of claim 1, wherein the displayed list of recently viewed channels on the mobile device does not include channels that are included in the list of currently viewed channels throughout the wireless network.

4. The media of claim 1, wherein each portion displayed on the mobile device displays the most-viewed channels of the portion's respective list.

5. The media of claim 1, further displaying on the mobile device a list of least-viewed content throughout the wireless network.

6. One or more nontransitory computer-readable media having embodied thereon computer-useable instructions that, when executed, cause one or more computing devices to perform a method for providing a list of available broadcast channels utilizing a wireless network to a mobile device, wherein the list of available broadcast channels includes channels that can be broadcast most efficiently to the mobile device, the method comprising:
   streaming channel-based content to a plurality of video media proxy (VMP) servers, wherein each VMP server is located on a respective one of a plurality of access service networks within the telecommunications network;
   determining a list of currently broadcast channels in the access service network that is providing access to the mobile device;
   communicating to the mobile device a portion of the list of currently broadcast channels in the access service network that is providing access to the mobile device;
   determining a list of channels that are currently being viewed in the plurality of access service networks throughout the telecommunications network; and
   communicating to the mobile device a portion of the list of channels that are currently being viewed in plurality of access service networks throughout the telecommunications network, wherein the portion of the list of currently viewed channels throughout the telecommunications network does not include channels that are included in the list of currently broadcast channels within the access service network that is providing access to the mobile device.

7. The media of claim 6, the method further comprising communicating from a VMP server to the mobile device the portion of the list of currently broadcast channels in the access service network that is providing access to the mobile device.

8. The media of claim 6, the method further comprising receiving from each of the plurality of VMP servers a list of currently broadcast channels in the access service network associated with each VMP server.

9. The media of claim 6, wherein determining the list of channels that are currently being viewed in the access service networks throughout the telecommunications network is based on the received lists of currently broadcast channels in the access service networks associated with the VMP servers.

10. The media of claim 9, wherein determining the list of channels that are currently being viewed in the access service networks throughout the telecommunications network is performed by a broadcast management server (BMS) that manages broadcast channels within the plurality of access service networks throughout the telecommunications network.

\* \* \* \* \*